2,852,940

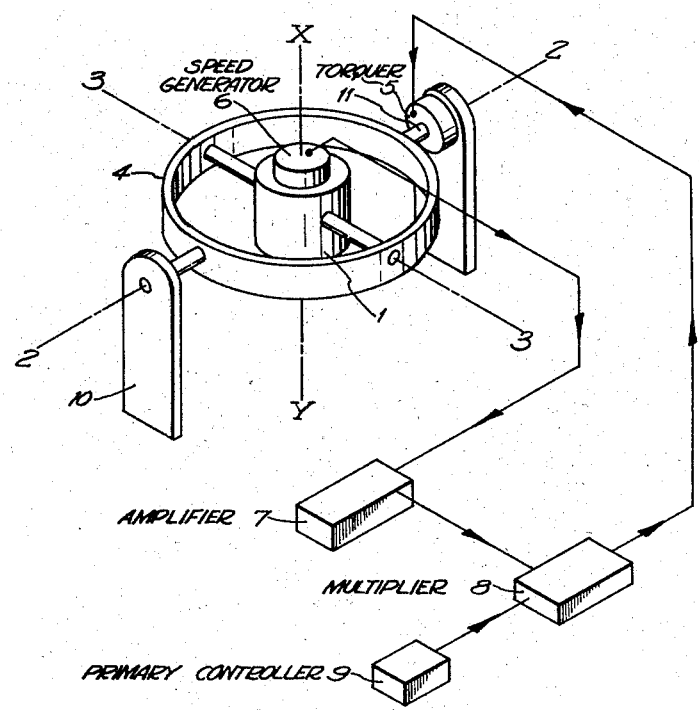

GYROSCOPIC APPARATUS

Roger William Seymour-Lee, Wargrave, England, assignor to The Sperry Gyroscope Company Limited, Brentford, England, a British company Application May 12, 1954, Serial No. 429,296

4 Claims. (Cl. 74—5.4)

This invention relates to gyroscopic apparatus and more particularly to gyroscopic apparatus in which the rotor element may be caused to precess about an axis perpendicular to the spin axis of the gyroscope by the application of a torque to it by a torque-applying means, the torque acting about an axis perpendicular both to the spin axis of the gyroscope and to the axis about which the precession is to take place.

It is sometimes desired in gyroscopic apparatus to precess the spinning rotor element or casing about an axis at a predetermined rate which is proportional to a primary control signal provided by a control device. Gyroscopic apparatus is known in which provision is made to secure this result; these gyros are often referred to in the art as "angle gyros," an example of which is shown in the patent to Harris, No. 2,586,817 dated February 26, 1952, Stabilization System for Gunfire Control Apparatus and the Like. For this purpose a torque-applying device is provided to which the primary control signal is supplied to cause a torque to be applied to the rotor casing whose value is determined by the magnitude of the control signal. In such known gyroscopic apparatus the rate of precession produced in the rotor casing is not always accurately the same for the same value of the control signal in view of the fact that the precession rate produced by a given applied torque is inversely proportional to the speed of rotation of the rotor of the rotor casing which speed is usually itself subject to variations for various reasons such as, for example, variations in the supply of motive power to spin the rotor.

It is accordingly an object of the present invention to provide gyroscopic apparatus in which the precession rate produced by a given applied torque is substantially independent of variations in the speed of rotation of the rotor.

According to one aspect of the invention there is provided gyroscopic apparatus in which, in order to produce precession of the rotor casing about an axis at a rate proportional to a primary control signal irrespective of changes in the speed of rotation of the rotor, a torque is applied to it that is proportional to the primary control signal and to an output or signal that is a measure of the speed of rotation of the rotor.

According to another aspect of the invention there is provided a rotor element mounted with freedom of angular movement about a precession axis in a support, a means for applying torques to the rotor element to cause it to precess about said axis, a device responsive to and providing a control signal that is proportional to the speed of the rotor, a device for providing a primary control signal, the torque means being so constructed, arranged and adapted to be energised from said two signals that the torque applied to the rotor element is proportional to both signals so that the rate of precession produced is proportional to the primary control signal irrespective of any changes of speed of the rotor that may occur.

An embodiment of the invention will now be described by way of example only with reference to the accompanying schematic drawing.

A gyroscope, comprising a rotor casing or frame 1 and a rotor (not shown) mounted therein for spinning about the axis X—Y, is pivotally mounted about two mutually perpendicular axes 2—2, 3—3 in a support 10 by means of a gimbal ring 4. An electric torque device or means 5, a part of which is mounted on the support 10 and a part of which is mounted on the shaft 11, is provided for applying torques to the rotor-bearing frame 1 about the torque axis 2—2 so as to cause precession of the casing about the precession axis 3—3 at a rate dependent upon a control signal applied to the torque motor. A primary controller or means 9 provides a primary signal in dependence on which the rotor element or casing 1 is caused to process.

On the rotor casing or frame 1 of the apparatus an electrical tacho-generator 6 is mounted to be driven by the rotor of the gyroscope so as to provide an output signal proportional to the speed of the rotor. The output of this rotor speed signal means is supplied to an amplifier 7 and thereafter applied as an input quantity to the electrical multiplier 8 to which is also applied, as an input quantity, the primary control signal derived from the primary controller 9. The electrical multiplier 8 provides an output signal which is a measure of the product of the magnitudes of the two input signals, that is, the magnitudes of the speed signal and the primary control signal and this output is applied to the torque means 5. In this way the torque applied to the rotor frame 1 is proportional to or varies in accordance with the speed of the rotor and also to the primary control signal derived from the primary controller 9 so that the precession rate produced for a given primary control voltage is substantially independent of the rotor speed.

It will be appreciated that a similar arrangement to that described above may be provided for precessing the rotor frame 1 about its other axis 2—2.

The foregoing description of one particular embodiment of the invention is given by way of example only, and it will be appreciated that the invention may take other forms without departing from the scope thereof. For example, the primary control signal and the speed signal may both be converted into mechanical movements which are multiplied together by means of a simple linkage to produce a resultant mechanical movement. This resultant movement may be applied to operate a potentiometer thus producing a D.-C. signal proportional to the produce of the primary control voltage and the speed signal. The D.-C. signal is applied to the torque means 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic apparatus, a support, a spinning rotor element mounted on said support with freedom about a precession axis, a speedometer device providing a signal proportional to the speed of the rotor of said rotor element, a device providing a primary control signal, and a device responsive to the signals of said speedometer device and control device for applying a torque on said element that varies in accordance with the control signal and the speed of rotation of the rotor of said element to effect precession of the element about said axis.

2. Apparatus as claimed in claim 1, including a multiplying device for the signals of said speedometer device and control device having an output operatively connected to said torque applying device.

3. The combination in a gyroscopic apparatus of, a gyroscopic rotor casing supported with freedom about displaced torque and precession axes, signal means providing an output in accordance with the speed of rotation of the rotor of the gyroscopic rotor casing, means for providing a primary control signal, and means for exerting a torque about the torque axis of said rotor casing that varies in accordance with the signal of said control signal means and the output of said speed signal means.

4. The combination in a gyroscopic apparatus of, a gyroscopic rotor casing supported with freedom about displaced torque and precession axes, signal means providing an output in accordance with the speed of rotation of the rotor of the gyroscopic rotor casing, means for providing a primary control signal, multiplying means for providing an output in accordance with the product of the output of said speed signal means and the signal of said control signal means, and means for applying a torque about the torque axis of said casing in accordance with the output of said multiplying means.

References Cited in the file of this patent

UNITED STATES PATENTS

| | | |
|---|---|---|
| 1,640,549 | Lamme | Aug. 30, 1927 |
| 2,011,738 | Urfer | Aug. 20, 1935 |
| 2,328,744 | Roters | Sept. 7, 1943 |
| 2,486,897 | Wendt | Nov. 1, 1949 |
| 2,548,918 | Stein | Apr. 17, 1951 |

FOREIGN PATENTS

| | | |
|---|---|---|
| 107,654 | Sweden | June 15, 1943 |